United States Patent [19]
Rappaport et al.

[11] Patent Number: 5,722,043
[45] Date of Patent: *Feb. 24, 1998

[54] METHOD AND APPARATUS OF ASSIGNING AND SHARING CHANNELS IN A CELLULAR COMMUNICATION SYSTEM

[75] Inventors: Stephen S. Rappaport, Stony Brook, N.Y.; Hua Jiang, Plano, Tex.

[73] Assignee: The Research Foundation of State University of New York, Albany, N.Y.

[ * ] Notice: The term of this patent shall not extend beyond the expiration date of Pat. No. 5,437,054.

[21] Appl. No.: 506,506

[22] Filed: Jul. 25, 1995

Related U.S. Application Data

[63] Continuation-in-part of Ser. No. 14,329, Feb. 5, 1993, Pat. No. 5,437,054.

[51] Int. Cl.⁶ .............................. H04Q 7/00; H04Q 9/00
[52] U.S. Cl. .................... 455/33.1; 455/34.1; 455/56.1; 379/58
[58] Field of Search ................... 455/33.1, 33.4, 455/34.1, 54.1, 56.1, 67.1; 379/59

[56] References Cited

U.S. PATENT DOCUMENTS

| | | | |
|---|---|---|---|
| 3,898,390 | 8/1975 | Wells et al. | 179/41 |
| 4,025,853 | 5/1977 | Addeo | 325/55 |
| 4,128,740 | 12/1978 | Graziano | 179/2 |
| 4,144,411 | 3/1979 | Frenkiel | 179/2 |
| 4,222,115 | 9/1980 | Cooper et al. | 375/1 |
| 4,249,181 | 2/1981 | Lee | 343/100 |
| 4,310,722 | 1/1982 | Schaible | 179/2 |
| 4,355,411 | 10/1982 | Reudink et al. | 455/33 |
| 4,384,362 | 5/1983 | Leland | 455/33 |
| 4,613,990 | 9/1986 | Halpern | 455/33 |
| 4,696,027 | 9/1987 | Bonta | 379/60 |
| 4,759,051 | 7/1988 | Han | 379/59 |
| 4,866,788 | 9/1989 | Mouly et al. | 455/54 |
| 4,914,651 | 4/1990 | Lusignan | 370/69.1 |

(List continued on next page.)

FOREIGN PATENT DOCUMENTS

| | | |
|---|---|---|
| 60-106238 | 6/1985 | Japan. |
| WO 91/01073 | 1/1991 | WIPO. |

OTHER PUBLICATIONS

IEEE Transactions on Vehicular Technology, vol. 38, No. 4, "Comparisons of Channel–Assignment Strategies in Cellular Mobile Telephone Systems", Nov. 1989, pp. 211–215.

IEEE, "Hot–Spot Traffic Relief in Cellular Systems", pp. 1703–1709 (1992).

IEEE, "An Agressive Dynamic Channel Assignment Strategy for a Microcellular Environment", pp. 1027–1038 (1994).

Primary Examiner—Reinhard J. Eisenzopf
Assistant Examiner—Darnell R. Armstrong
Attorney, Agent, or Firm—Hoffmann & Baron, LLP

[57] ABSTRACT

A method of assigning and sharing carriers in a cellular communications system having a plurality of cells forming a plurality of cell clusters of size N. Each cell has at least one base station capable of sending and receiving signals and each cell has a plurality of adjacent cells. A plurality of distinct carriers are allotted for use by the system and divided into N groups which are assigned among the N cells of each cell cluster so that each cell cluster has a substantially similar assignment of distinct carrier groups. Each group of distinct carriers is divided into a plurality of carrier subgroups wherein each subgroup of carriers of a cell substantially corresponds to an adjacent cell. The subgroups of carriers are respectively designated for borrowing by cells adjacent to a corresponding cell. When all of the carriers assigned to a cell are utilized, a carrier can be borrowed at limited transmitted power, from a corresponding subgroup of carriers of an adjacent cellular gateway. The borrowed carrier is used with limited transmitted power so that co-channel interference caused by the carrier borrowing is essentially the same as that without carrier borrowing. A method is also provided for assigning and sharing carriers and prioritizing the order of return of the carriers from a borrowing cell to a lending cell.

26 Claims, 9 Drawing Sheets

U.S. PATENT DOCUMENTS

| | | | |
|---|---|---|---|
| 5,014,342 | 5/1991 | Pudsey | 455/33 |
| 5,038,399 | 8/1991 | Bruckert | 455/33 |
| 5,050,234 | 9/1991 | Ohteru | 455/34 |
| 5,056,109 | 10/1991 | Gilhousen et al. | 375/1 |
| 5,067,147 | 11/1991 | Lee | 379/60 |
| 5,073,971 | 12/1991 | Schaeffer | 455/33 |
| 5,111,534 | 5/1992 | Benner | 455/33.2 |
| 5,134,709 | 7/1992 | Bi et al. | 455/33.1 |
| 5,168,575 | 12/1992 | Cizek et al. | 455/33.1 |
| 5,233,643 | 8/1993 | Naeini et al. | 379/59 |
| 5,239,676 | 8/1993 | Strawczynski et al. | 455/33.2 |
| 5,247,699 | 9/1993 | Hartman | 455/33.1 |
| 5,280,630 | 1/1994 | Wang | 455/56.1 |
| 5,282,222 | 1/1994 | Fattouche et al. | 375/1 |
| 5,353,332 | 10/1994 | Raith et al. | 379/59 |
| 5,437,054 | 7/1995 | Rappaport et al. | 455/33.1 |
| 5,448,754 | 9/1995 | Ho et al. | 455/34.1 |
| 5,513,379 | 4/1996 | Benveniste et al. | 455/33.1 |

METHOD AND APPARATUS OF ASSIGNING AND SHARING CHANNELS IN A CELLULAR COMMUNICATION SYSTEM

CROSS REFERENCE TO RELATED APPLICATION

This application is a continuation-in-part of U.S. patent application Ser. No. 08/014,329 filed Feb. 5, 1993, now U.S. Pat. No. 5,437,054 issued Jul. 25, 1995, the disclosure of which is incorporated herein by reference.

This application is based on work conducted with support provided under GRANT No. N00014-91-5-4063 awarded by the Department of the Navy and GRANT No. NCR 9025131 awarded by the National Science Foundation.

BACKGROUND OF THE INVENTION

1. Field of the Invention

The present invention relates to cellular communication systems, and more particularly relates to a cellular communication system wherein a base station (also known as a gateway) of a cell can borrow channels or carriers from adjacent cellular base stations.

2. Description of the Prior Art

Since the demand for channels to serve users of cellular communication systems is expected to grow rapidly in the near future, there is a strong interest to develop techniques which enhance system capacity for a given grade of service. Additionally, it is desirable for mobile communication systems to be able to accommodate spatially localized user communication overloads which do not normally occur within a particular cellular region. Such overloads (commonly referred to as "hot spots") may be caused by events such as vehicular traffic jams. Hot spot overloads can cause unacceptable degradation of performance and capacity for traditional cellular communication systems. These hot spots can be particularly disturbing to persons who desire to use the system, who for example, may be caught in highway traffic.

In order to reduce the likelihood that hot spots will overload a region of the cellular communication system, some schemes reserve a group of channels for use only when a hot spot develops. However, this is generally inefficient because the reserved channels are not utilized during normal system operation which results in a diminished normal system capacity. An alternative to the above involves borrowing communication channels for use in the "hot spot" cell from gateways which are not in an overload condition.

There are generally two types of channel borrowing techniques. The first involves a scheme wherein a channel (designated a borrowed channel) is temporarily transferred to a borrowing cell and used therein in a manner similar to that of channels which are permanently assigned to the borrowing cell. In addition, the borrowed channel is used with the same power as the channels permanently assigned for use by the borrowing cell. Dynamic channel assignment (DCA) and hybrid channel assignment (HCA) are two methods that utilize this channel borrowing scheme. In DCA, there is a central pool of channels which are accessed by each cell of the system. Each cell can temporarily borrow a channel from the central pool of channels for the duration of a transmission. When the transmission is complete, the channel that was borrowed by the cell is returned to the central pool of channels. In HCA, the channels to be used by the system are divided into two groups. Some channels are permanently assigned to specific cell gateways as in fixed channel assignment (FCA) schemes, and others are kept in a central pool for borrowing during regional overloads as in DCA. In HCA and DCA, channel locking is used to prevent an increase in co-channel interference which occurs when proximately located cells utilize the same channel for transmission. Channel locking prevents cellular gateways, within a minimum reuse distance, from simultaneously using the same channels for transmission or reception.

Channel locking, which is associated with channel borrowing, does have disadvantages. First, the number of channels that are available for lending to other cells is relatively limited. This is due to the fact that a channel can be borrowed by a cell only when the channel to be borrowed is not being used within the minimum channel reuse distance from the borrowing cell. Another disadvantage of channel locking is the difficulty in maintaining the required minimum co-channel reuse distance everywhere in the system. Because of this difficulty, DCA and HCA generally perform less satisfactorily under high communication traffic loads than FCA systems (wherein each cell is allocated a set of channels that are also used within other cells that are sufficiently distant from common channel cells so that co-channel interference will not pose a significant problem).

Several modified DCA and HCA schemes have been suggested to mitigate the need for channel locking. Systems have been proposed wherein a rearrangement of channels occurs when a channel becomes available in a cell that has borrowed a channel from another cell. This minimizes the traffic carried on borrowed channels. Systems have also been proposed wherein directional channel locking and locally optimized dynamic channel assignment are used to increase the number of channels available for borrowing and to minimize the channel reuse distance of borrowed channels. This provides a reduced probability of blocking incoming and outgoing transmissions. Since all of these systems still use channel locking, each is incapable of completely overcoming the associated inherent disadvantages.

In addition to the drawbacks of channel locking, further disadvantages of channel borrowing relates to the physical complexity of the system employing such a method. Specifically, the base station of each cell (i.e., gateway) must be able to transmit and receive not only on the channels specifically allocated to that cell, but also on any of the channels that are allocated to the central pool of channels. Finally, to implement channel borrowing at a given gateway, information regarding the channels being used at all cellular gateways within the channel reuse distance of the given cellular gateway must be known. This causes additional complexity in the management of system channel resources.

The second type of channel borrowing system involves assigning channels to each cellular gateway as in FCA. But, if a new call finds all channels assigned to the subject cell occupied, the call will not necessarily be blocked. Instead, if the user is also within range of a neighboring cell's gateway, the user will try to use a channel that was assigned to the neighboring cell's gateway. The link is established through the gateway of the neighboring cell. This type of borrowing scheme utilizes the overlapping coverage areas of cellular gateways. With this type of borrowing system, channels are not temporarily transferred from one cellular gateway to another, only the right to use a particular channel is transferred to (a user in) another cell.

An advantage of this type of channel borrowing is that each cellular gateway must only accommodate the channels assigned to the gateway itself. The simplicity of such an arrangement has accompanying limitations. Users of borrowed channels must be in the region of coverage overlap provided by the adjacent cell gateway. As a result, the users tend to be relatively far from the cellular gateways through which they transmit and receive signals. Therefore, the quality of borrowed channel transmissions is lower than that of a cell's regular assigned channels. By utilizing such a channel borrowing system, co-channel interference is also increased because the borrowed channels are used beyond their normal transmission range. In order to limit co-channel interference, the overlap among cells should be minimized. Overlap among two or three adjacent cells is usual, and therefore a given user can only access one or two neighboring additional cellular gateways. This limits the number of channels that are potentially available for transmission during a "hot spot" condition.

OBJECTS AND SUMMARY OF THE INVENTION

It is an object of the present invention to provide a cellular communication method and apparatus wherein cell gateways can borrow channels from adjacent cellular gateways without the use of channel locking.

It is another object of the present invention to provide a cellular communication method and apparatus wherein borrowed channels which are temporarily transferred to a neighboring cell gateway are used with limited transmitted power.

It is yet another object of the present invention to provide a cellular communication method and apparatus wherein the co-channel interference caused by channel borrowing is essentially the same as the co-channel interference which occurs when there is no channel borrowing.

It is yet another object of the present invention to provide a cellular communication method and apparatus wherein it is not necessary for each cellular gateway to be able to transmit and receive on all channels used by the cellular communication system.

It is yet another object of the present invention to provide a cellular communication system which exhibits good performance during both normal and heavy communication traffic loads.

It is still another object of the present invention to provide a cellular communication system wherein control and management tasks are simplified because channel borrowing at a cellular gateway does not require global information about channel usage within the cellular communication system.

It is still a further object of the present invention to provide a method to enhance traffic capacity which can be employed in cellular communication systems without additional costly infrastructure.

It is still a further object of the present invention to provide a cellular communication system and method which discourages excessive channel lending and borrowing and which provides a substantially uniform grade of service throughout the system.

It is yet another object of the present invention to provide a cellular communication system and method wherein carriers are lent to adjacent cells and the carrier are efficiently returned to lending cells.

It is yet a further object of the present invention to provide a method and apparatus of assigning and sharing channels in a cellular communications system which overcomes the inherent disadvantages of known communications systems.

In accordance with one form of the present invention, a method of permitting real-time borrowing of channels, without locking, in a cellular communication system may include the steps of forming a plurality of substantially similar cell clusters of size N from a plurality of cells. Each cell has a plurality of adjacent cells and is equipped with a base station for sending and receiving transmissions. The method includes determining the total number of channels available for use by the system. The method further includes distributing the plurality of channels into N distinct channel groups and assigning one channel group per cell of each cell cluster. This channel assignment is done in a substantially similar manner to each cell cluster. As a result, corresponding cells of each cell cluster have substantially the same group of channels assigned thereto. Thereafter, each distinct channel group is divided into a plurality of channel subgroups wherein each channel subgroup substantially corresponds to one of the adjacent cells proximate to the given cell. Each subgroup of distinct channels within a cell is allocated for borrowing by a corresponding respective adjacent cell.

The method may also include the steps of receiving a request within a first cell for use of a channel to transmit a first signal and determining whether each distinct channel assigned to the first cell is in use. Then, the method includes determining whether at least one channel of the subgroup of distinct channels assigned to cells respectively adjacent to the first cell, and designated for borrowing by the first cell, is available for use. The method further includes transferring the available channel from the respective adjacent cell to the first cell for use by the gateway of the first cell at a reduced transmitted power so that co-channel interference caused by the channel borrowing is not worse than that without channel borrowing. After transmission of the first signal is complete, the available channel that was borrowed by the first cell is returned to the respective adjacent cell.

In accordance with another form of the present invention, a cellular communication system permitting real-time borrowing of channels, without locking, includes a plurality of channels and a plurality of cell clusters. Each cell cluster has a plurality of cells with at least one gateway wherein each of the plurality of cells has a plurality of adjacent cells. The plurality of channels are divided into a plurality of channel groups corresponding to the number of cells utilized for each cell cluster. Each of the plurality of channel groups are respectively assigned to one of the plurality of cells of each cell cluster. Each group of the plurality of channel groups are further divided into a plurality of channel subgroups corresponding to at least the number of cells adjacent to the given cell. Each subgroup of channels assigned to a given cell is respectively designated for borrowing by one of the plurality of cells adjacent to the respective given cell. Therefore, when the channels of a first cell are occupied, and an additional channel is required for signal transmission, an available channel is borrowed from the channel subgroup of a corresponding adjacent cell which was designated for borrowing by the first cell.

In accordance with another form of the present invention, a method of permitting real-time borrowing of carrier signals in a cellular communication system includes the steps of receiving a request to either transmit or receive a new call within a first cell and determining whether each of the carriers assigned to the first cell are unavailable for transmission and reception. The method further includes transmitting a carrier borrowing request from the first cell to at least one of the plurality of adjacent cells and determining whether one of the plurality of adjacent cells will grant or deny the carrier borrowing request by determining the number of carriers currently provided to the first cell by one of the adjacent cells, determining the number of carriers provided by one of the adjacent cells to all other cells, and determining whether each of the plurality of channels of at least one carrier of an adjacent cell is available for transmission.

In accordance with another form of the present invention, a method of returning a borrowed carrier signal from a borrowing cell to a lending cell in a cellular communication system includes the steps of selecting one of a first and second carrier of the lending cell as a primary borrowed carrier. The method further includes determining whether at least one channel of the carriers assigned to the borrowing cell is available for signal transmission, selecting one of the cells adjacent to the borrowing cell which provided a carrier (primary borrowed carrier) to the borrowing cell and transferring a call from one of the channels of the primary borrowed carrier to the available channel of the borrowing cell.

A preferred form of the method and apparatus of assigning and sharing channels and carries in a cellular communication system, as well as other embodiments, objects, features and advantages of this invention will be apparent from the following detailed description of illustrative embodiments thereof, which is to be read in connection with the accompanying drawings.

DETAILED DESCRIPTION OF THE PREFERRED EMBODIMENTS

Figure 1:
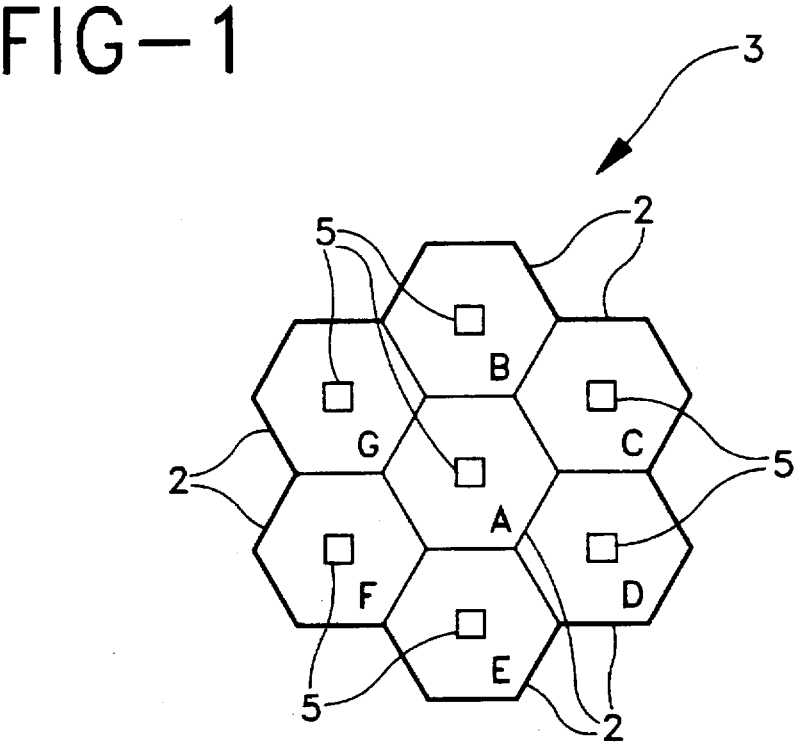
FIG. 1 is a simplified diagram of a cell cluster having seven cells wherein seven channel groups (A, B, C, D, E, F, G) are assigned to the cells of the cell cluster.

Referring to FIG. 1 of the drawings, a preferred method and apparatus of assigning and sharing channels in a cellular communication system will now be described. The method and apparatus are designed to more efficiently allocate channels within a communication system so as to prevent the occurrence of communication overloads and the resulting inability to transmit a signal to, from, and within, a given cellular region 2 without employing channel locking. As used hereinafter, a cell is defined as a territorial area of a regular shape that is served by a given base station 5.

Figure 1A:
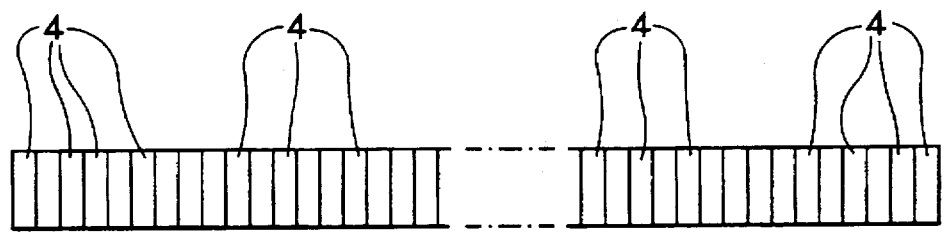
FIG. 1A is a simplified diagram of a spectrum of channels.

The cellular communication system of the present invention has a total of $C_T$ distinct channels and a plurality of cells 2 which, during channel allocation, define a cell cluster 3 of size N. Referring to FIG. 1A, a plurality of distinct channels 4 are shown. The channels can be organized as distinct frequency band slots, time slots (on a given frequency band) or other useful channel arrangement scheme. As used hereinafter, distinct channels implies that transmission of a signal on a particular channel does not substantially interfere with signal transmissions of other channels.

Referring to FIG. 1, each cell of the communication system includes a centrally located base station 5, referred to hereinafter as a gateway, for emitting and receiving signal transmissions of users within a respective cell 2. The gateway can be omnidirectional and include one transmitter/receiver. Alternatively, the gateway could include a plurality of unidirectional transmitters/receivers deployed in a sectorized cellular configuration wherein each sectorized gateway of a cell is assigned a fixed group of distinct channels for use within a particular sector area of the cell. Preferably, a cell cluster 3 represents an arrangement of a plurality of similarly configured cells having distinct channel assignments wherein each cell is substantially surrounded by adjacent similarly configured cells as shown in FIG. 1. The cell cluster size (N) can vary and may be selected in accordance with the dimensions and requirements of the communication system. However, in the preferred embodiment, it is desirable to choose a cell cluster size such that each cell cluster of the communication system is symmetric. Some of the potential cluster sizes which provide symmetry include clusters composed of 3, 4, 7, 9, 12, 13, 16, 19, 21, 25 and 27 cells, for example.

Figure 2:
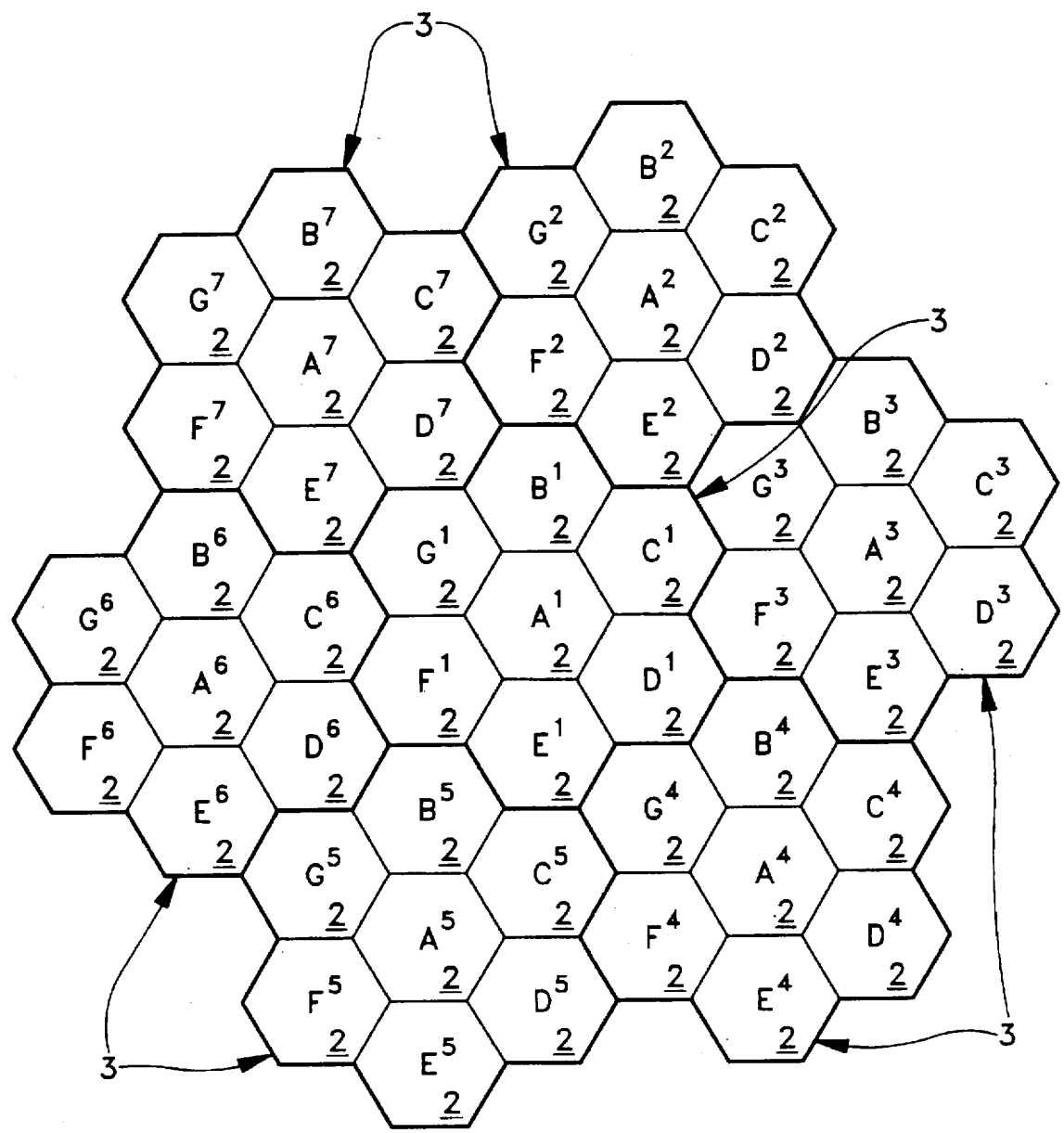
FIG. 2 is a simplified diagram of the cellular communication system of the present invention having seven cell clusters and seven channel groups assigned to each cell cluster.

As the cluster size (N) changes, it may be advantageous to also change the shape of the cells which combine to form the cell cluster. The shapes which are commonly used to represent regions of a cellular communication system include the hexagon, triangle and square. However, for simplicity of presentation, shown in FIG. 1 is a cell cluster 3 of size seven (N=7) wherein six hexagonal-shaped cells (B, C, D, E, F and G) substantially surround a seventh cell (A) in one plane. The cellular communication system of the present invention may include a single cell cluster, as shown in FIG. 1, or a plurality of substantially similarly configured cell clusters 3 as shown in FIG. 2. The system of FIG. 2 shows the overlapping configuration of the cell clusters 3 wherein each cell 2, even if not at the center of a cell cluster, has a plurality of adjacent cells which can belong to neighboring cell clusters. Therefore, the cell cluster designation is only important for assigning the channel groups to the cellular system.

In a preferred embodiment of the present invention, the total number of channels (CT) are divided into N groups (in the preferred embodiment identified as A, B, C, D, E, F and G) which are distributed among the N cells that comprise a first cell cluster (cells $A^1$, $B^1$, $C^1$, $D^1$, $E^1$, $F^1$ and $G^1$). These same channel groups are also assigned to the cells of every other cell of the communication system in a substantially similar manner. As a result, each cell of each cell cluster will substantially be assigned one group of channels ($C_T/N=C$ distinct channels) for transmission. However, it is important to note that each group of channels need not have an identical number of channels. Specifically, if a particular group of cells to which a channel group will be assigned regularly have a high volume of transmissions as compared to other cells, then the $C_T$ distinct channels can be allocated to each of the N channel groups according to the usual transmission requirements. It should be noted that once the N channel groups have been determined, the groups must not be altered so that the channels within each channel group are consistent within each cell cluster of the communications system. For simplicity and for most applications, it will be sufficient to equally allocate the $C_T$ channels among the N channel groups assigned to the cells of each cell cluster. The cells of the communication system are preferably designated and differentiated from one another in accordance with the groups of channels assigned thereto (i.e. A, B, C, D, E, F and G). An important restriction on this channel assignment is that no two cells in any cell cluster can have common channel assignments (i.e., two cells assigned the channels of group A) and that the cellular communication system must have a regular and recurring pattern of cell clusters and corresponding channel assignments.

Figure 3:
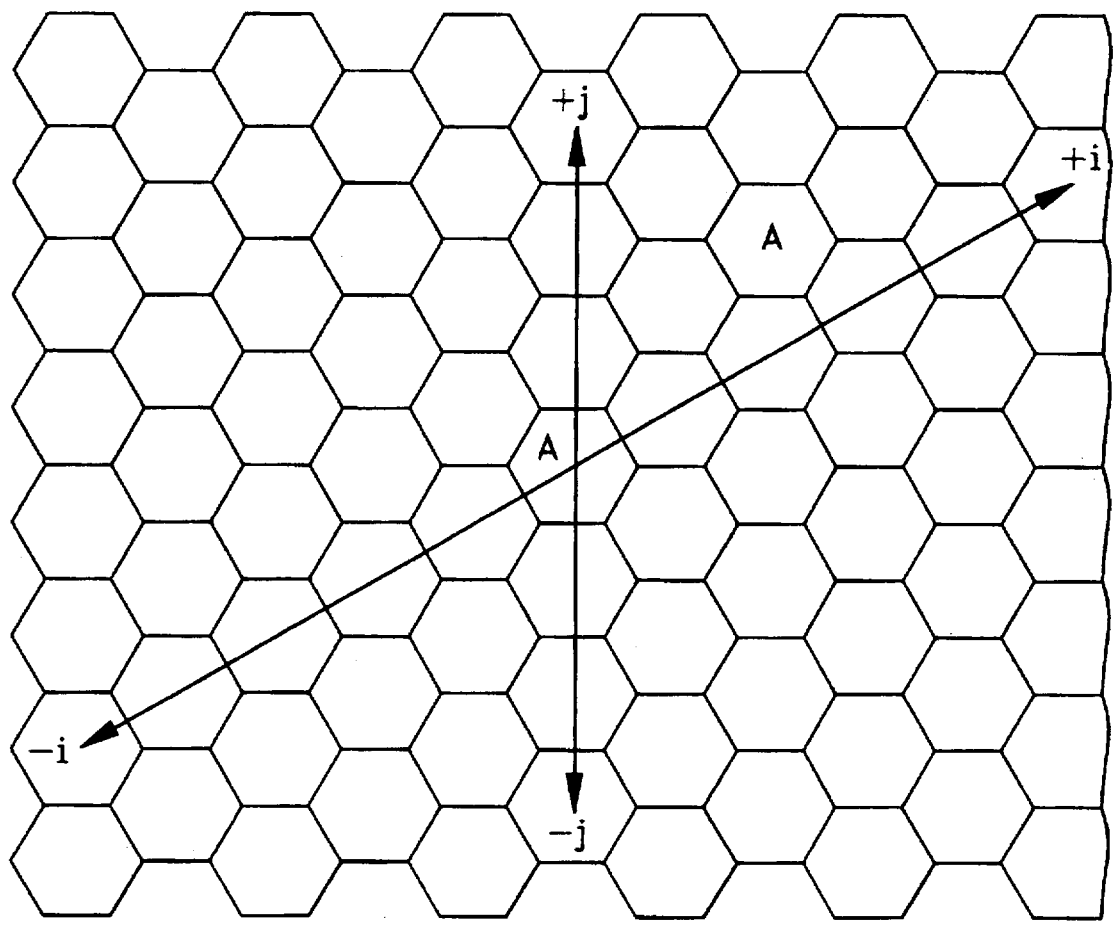
FIG. 3 is a simplified diagram of a coordinate map of the cellular communication system of the present invention and the nearest co-channel cell.

Referring now to FIG. 3, in order to minimize co-channel interference and carry out a proper channel allocation to the hexagonal cells as shown in FIG. 2, the N groups of channels are assigned to cellular regions according to the following formula:

$$N=i^2+j^2+ij$$

where N=the cluster size i=a first coordinate of the communication system j=a second coordinate of the communication system (60° off the direction of counting for the i-direction.)

According to this formula, solutions for possible cluster sizes can be calculated and the N channel groups can be properly assigned to respective cells. For example, for a cluster size of 7, the solution to the above formula is (i=±2, j=±1) or (i=±1, j=±2). Therefore, in order to minimize co-channel interference between co-channel cells (i.e. cells having the same channel group assignment), and to have a regular channel group assignment pattern, the nearest co-channel cell should be (±2, ±1) or (±1, ±2) cell units away from every other co-channel cell. It is important to note that whichever of the above solutions is used, either (±2, ±1) or (±1, ±2), the cell designations must be consistent and the same solution must be used to assign the channel groups to every cell of the communication system. FIG. 3 shows the location of the next nearest cell from the first cell having channel group assignment A for the solution (2, 1).

As previously mentioned, the cellular communication system of the present invention includes a plurality of cells. The N channel groups are preferably assigned to the plurality of cells to form a plurality of cell clusters so that the $C_T$ channels available to the communication system can be most effectively utilized to provide the maximum system capacity. As a result of the channel assignment solution above, the channel assignment cell pattern will repeat itself over the entire domain of the communication system. Such a configuration is shown in FIG. 2 wherein cells having a particular channel assignment are a minimum distance from co-channel cells of adjacent cell clusters. Therefore, cells which have common channel assignments will not substantially interfere with adjacent co-channel cell transmissions. As a result of the above-described channel allotment, the total number of channels assigned to the system can be more effectively utilized because each channel can be simultaneously utilized by cells having the same channel group assignment.

However, even with the above-described simultaneous channel usage, there may be instances wherein an unusually high number of channels, greater than the number assigned to a particular cell, are required to accommodate all desired transmissions within the particular cell. Specifically, the present invention allows a gateway of a cell to borrow a channel from cells adjacent thereto without resulting in co-channel interference. The method of the present invention includes further sub-dividing or sub-classifying each channel group. Preferably, the sub-division of channel groups includes dividing each of the N groups of channels into a plurality of channel subgroups. Each subgroup of channels respectfully corresponds to either the given cell or to one of the cells adjacent to the given cell. In the event all channels of a given cell are occupied, the subgroup designation identifies which channels, belonging to cells adjacent to the given cell, can be temporarily used by the given cell. As a result of the subdivision, the channels assigned to a particular cell, while being assigned to the cell for use therein, will also have a designation as to which adjacent cells can borrow the respective channel in the event all channels of the particular adjacent cell are in use.

Figure 4:
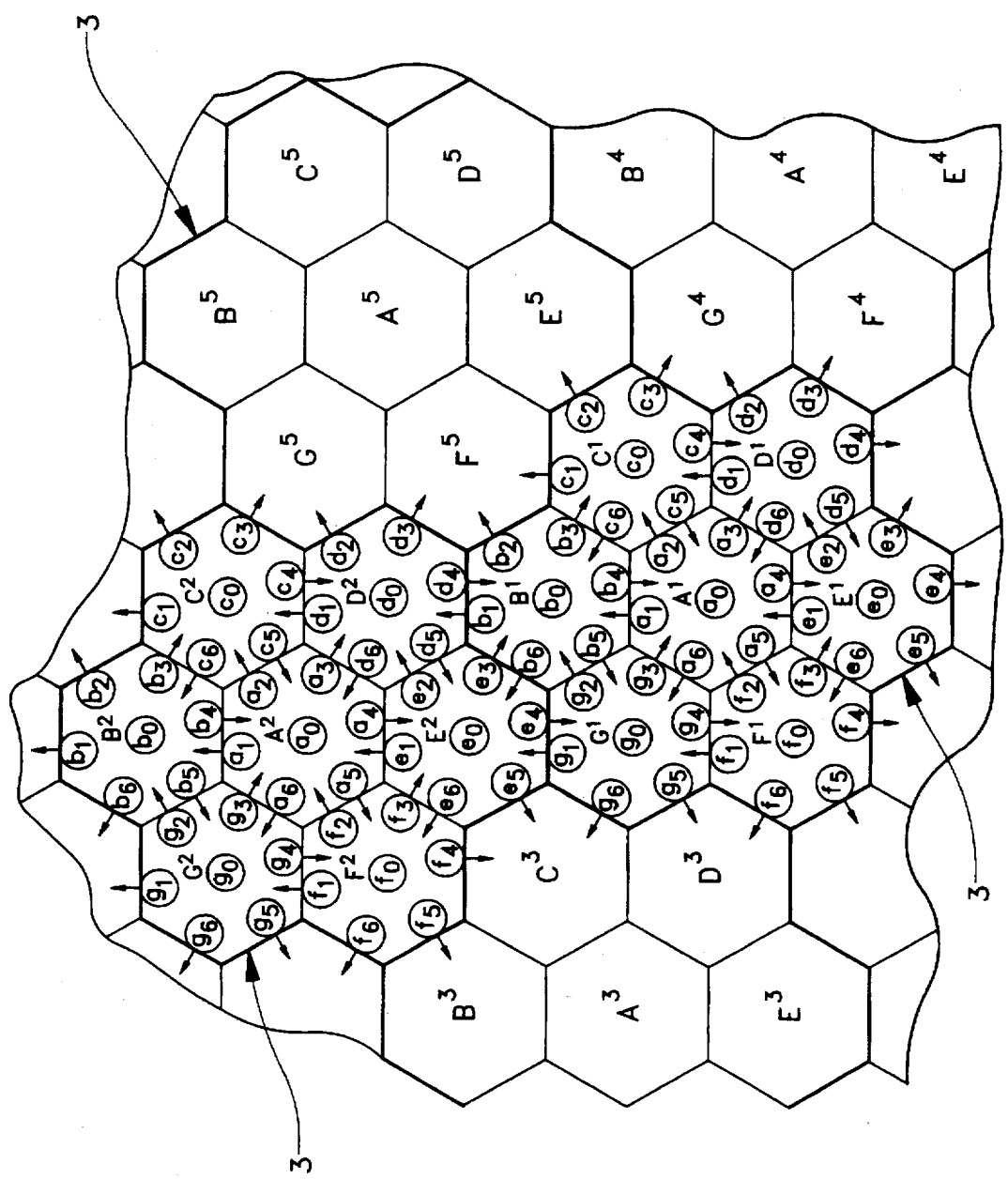
FIG. 4 is a simplified diagram of the cellular communication system of the present invention showing the channel group allotment and sub-division of each channel group.

One embodiment of the above-described method of sharing and assigning channels in a cellular communication system will be described with reference to FIG. 4. FIG. 4 shows a partial cellular communication system having a cluster size N=7. The system has $C_T$ channels which are divided among the N channel groups with about $C=C_T/N$ channels in each of the N cells of each cell cluster. For example, if there are $C_T=210$ distinct channels assigned to the communication system, and the $C_T$ channels are divided among the 7 cells which comprise each cluster, then approximately 30 distinct channels will be nominally assigned to each cell of a given cell cluster. Any of the 30 channels assigned to a given cell can be simultaneously used by the cellular gateway to which the channels are assigned.

The method of sharing and assigning channels in a cellular communication system includes subdividing the 30 distinct channels assigned to each cell. As discussed above, the subdivision identifies which channels are designated for borrowing by a respective adjacent cell during high volume communications within the adjacent cells. In a preferred embodiment, some of the 30 channels assigned to each cell are reserved for the exclusive use of any given cell and are not available for use by adjacent cells. The remaining channels are divided into groups corresponding to the cells adjacent to the given cell. For simplicity of explanation, of the 30 assigned channels in the preferred embodiment, approximately six specific channels may be reserved for use only by the gateway of the given cell. The remaining 24 channels will then be sub-divided for assignment among the six adjacent cells to yield six groups, each containing four channels. As a result as shown in FIG. 4, cell $A^1$ has the use of channel sub-groups designated by $a_0$–$a_6$ along with the right to borrow channels from cells $B^1$, $C^1$, $D^1$, $E^1$, $F^1$, and $G^1$ in the event all of the cell $A^1$ channels are in use. Specifically, cell $A^1$ could borrow cell $A^1$ channel from sub-group $b_4$, $c_5$, $d_6$, $e_1$, $f_2$ and $g_3$. In addition, one of the cells adjacent to cell $A^1$ (i.e., cells $B^1$, $C^1$, $D^1$, $E^1$, $F^1$, and $G^1$) could borrow channels from subgroups $a_1$, $a_2$, $a_3$, $a_4$, $a_5$ and $a_6$ respectively. However, as described above, the channels of group $a_0$ are reserved for the exclusive use by cell $A^1$ and can not be borrowed by any of the adjacent cells. It is a feature of the present invention that the channels assigned to each cell ($A^1$, $B^1$, $C^1$, $D^1$, $E^1$, $F^1$, and $G^1$) are the same for every cell cluster of the cellular communication system and that the subgroup of channels for each cell are also identical for each corresponding cell. Therefore, the group of channels and the subgroups of channels assigned to cell $A^1$ and $A^2$ are identical. As shown in FIG. 4, this channel lending may also occur between cell clusters wherein, for example, cell $B^1$ may borrow a channel from cells $A^1$, $G^1$, $E^2$, $D^2$, $F^3$, and $C^1$)

As a result of the above-described configuration, when the gateway of a cell receives a request for use of a channel from a user within a first cell ($A^1$), and all channels assigned to the first cell ($A^1$) are in use, the first cell looks to adjacent cells ($B^1$, $C^1$, $D^1$, $E^1$, $F^1$, and $G^1$) for an available channel. Any channel of the group of channels assigned to cells adjacent to the first cell which are not in use, and which belong to a subgroup of channels designated for lending to the first cell ($b_4$, $c_5$, $d_6$, $e_1$, $f_2$, and $g_3$), can be temporarily provided to the first cell to satisfy the channel request. The channel assignment and borrowing scheme of the present invention does not require a complicated channel management scheme and it prevents the occurrence of substantial co-channel interference that can arise during channel borrowing. Substantial co-channel interference is prevented because the channel assignment scheme of the present invention prohibits common channels from being simultaneously used in the same cell or neighboring cells.

Figure 5:
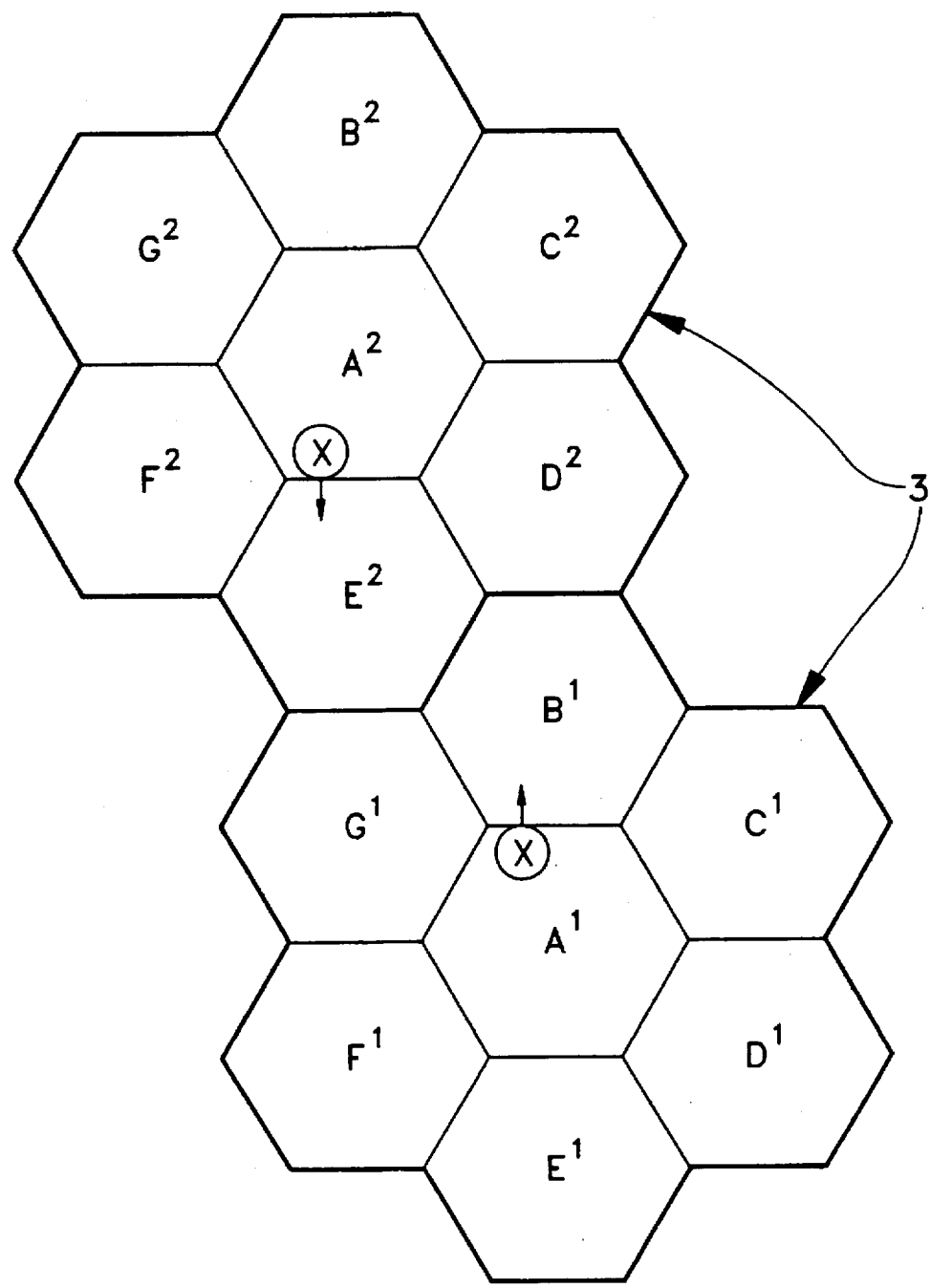
FIG. 5 is a simplified diagram illustrating one of the drawbacks associated with channel borrowing if subdivision of each channel group is not employed in accordance with the present invention.

Without a channel assignment scheme including subdivision of the channel groups as described above, a cell gateway could borrow any of the idle channels from an adjacent cell gateway as shown in FIG. 5. Cells $A^1$ and $A^2$ are co-channel cells having the same channel assignment. Cell $B^1$ could borrow a channel (X) from cell $A^1$ and cell $E^2$ could concurrently borrow the same channel (X) from cell $A^2$. It is evident from FIG. 5 that cells $B^1$ and $E^2$ are adjacent to cells $A^1$ and $A^2$ respectively, and cells $B^1$ and $E^2$ are adjacent to one another. Therefore, if the channel assignment and borrowing scheme of the present invention is not followed, the borrowed channel (X) would be used in adjacent cells and substantial co-channel interference would result. However, the present invention overcomes this problem due to the assignment of specific channels that can be provided to each adjacent cell wherein for any pair of nearest co-channel cells, adjacent cells located therebetween can never borrow the same channels. This is exemplified by FIG. 4 wherein channel subgroup $a_1$ can only be borrowed by cells $B^1$ and $B^2$, and channel subgroup $a_2$ can only be borrowed by cells $C^1$ and $C^2$, and so on. As a result of the present invention, when lending a channel to an adjacent cell, it is not necessary for the borrowing cell to know the channel usage of its neighboring cells. The assignment scheme of the present invention precludes conflicts in channel borrowing and the resulting excessive co-channel interference. Therefore, the borrowing of an available channel from an adjacent cell will never preclude another cell from borrowing the same co-channel. As a result, channel usage can be maximized within the cellular communication system.

Figure 6:
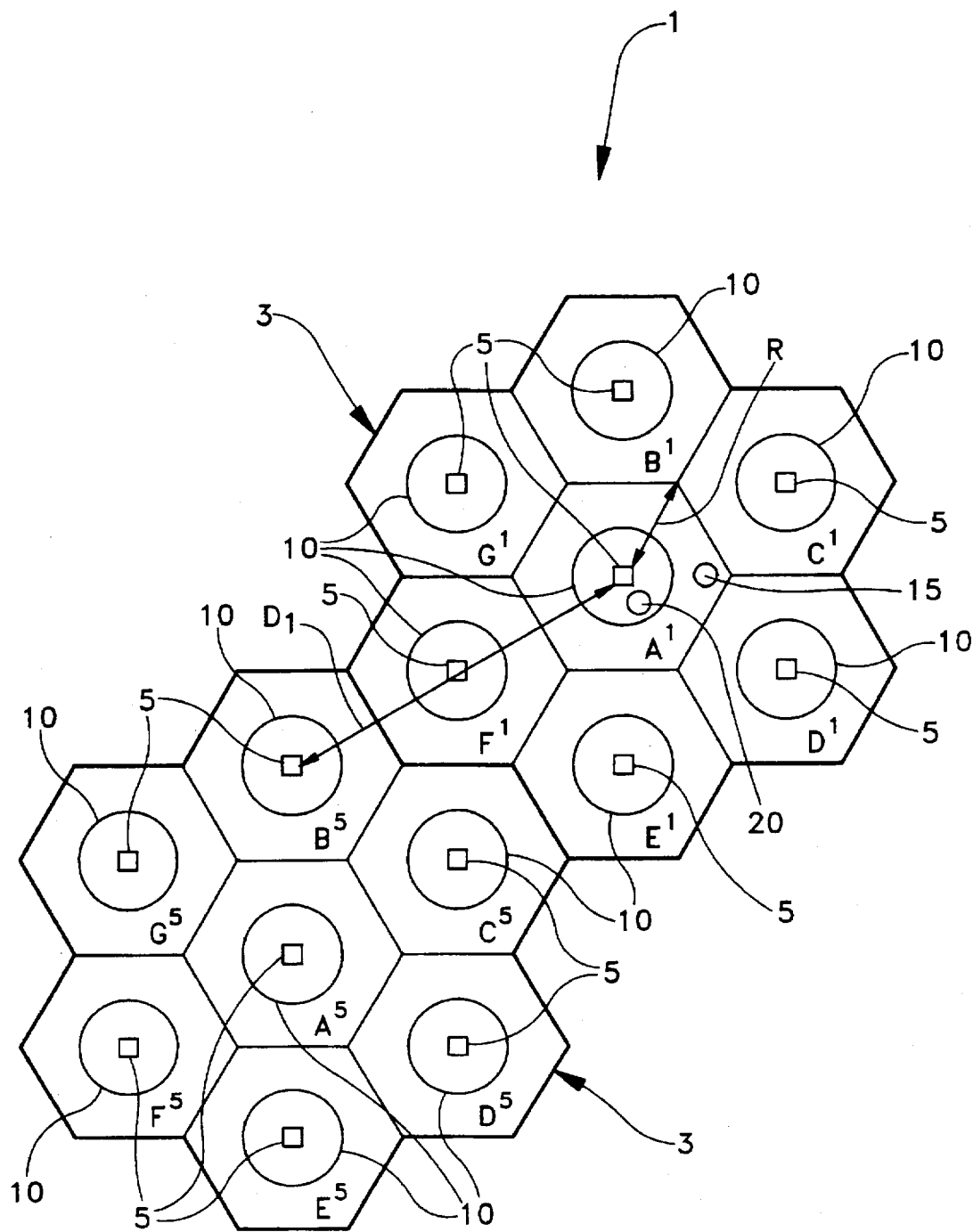
FIG. 6 is a simplified diagram illustrating a cell cluster of the present invention with its associated borrowed channel sensing signal region and the gateways.

In a preferred embodiment of the present invention, in order to further avoid possible increases in co-channel interference caused by channel borrowing, the channels that are made available for use in the respective adjacent cell (i.e., lending cell) during borrowing and the borrowed channels that are borrowed from respective adjacent cells are utilized with reduced or limited transmitted power. Since the borrowed channel is used with reduced power, the borrowed channels can only be accessed in a portion of the borrowing cell (i.e., less than the total area of the cell). Referring now to FIG. 6, this portion of the cell tends to be proximate to the cellular gateway as shown by region 10 of the cells (A, B, C, D, E, F and G) of each cell cluster 3, so that the user of the borrowed channel can establish a two-way link (between the transmitter and receiver antennas) of acceptable transmission quality (a suitably high signal to interference/noise ratio in each direction of transmission). The limited transmitted power on the borrowed channel is chosen so that co-channel interference for the cellular communication system does not appreciably differ from that of a cellular communication system that does not utilize channel borrowing.

For simplicity of derivation of the power level of the borrowed channels, flat uniform propagation conditions are assumed wherein each cell is hexagonal in shape utilizing an omnidirectional gateway wherein the user population is uniformly distributed throughout the system. Referring to FIG. 6, let R denote the distance from the gateway, preferably located at the center of the hexagonal cell, to a vertex of the respective cell for cell $A^1$. Let $D_1$ denote the distance between the cell gateway that borrows the channel and the nearest cell gateway (other than the lending cell gateway) to which the borrowed channel is regularly assigned, and let N be the cluster size of the cellular layout. For example if cell $A^1$ is to borrow a channel from cell $B^1$, then the distance $D_1$ is measured from the gateway of cell $A^1$ to the gateway of the nearest co-channel cell of $B^1$ (either $B^2$, $B^3$, $B^4$, $B^5$ or $B^6$), namely $B^5$, as shown in FIG. 6. Also let $\gamma$ be the propagation exponent wherein the received power, at a distance x from a cellular gateway or mobile user, varies as $x^{-\gamma}$. For a cellular communication system, theoretical and empirically derived formulas predict a value of $\gamma$ of between about 3 and about 5, the value being largely influenced by the conditions of the terrain.

Furthermore, for simplification of derivation, let $$a=[b(b-1)]/[(c-1)^2+(b-1)]$$

in which $$b=D_1/R$$

and $$c=(3N)^{1/2}$$

Then, no signal-to-interference degradation will result if the transmitted power on borrowed channels is chosen according to the following formulas.

For the forward link transmission direction, (gateway to mobile user) the ratio ($P_f$) of transmitted power on a borrowed channel to that on a regular channel is given by $$P_f=[(b-1)/(c-1)]^\gamma$$

For the reverse link transmission direction, (mobile user to gateway) the ratio ($P_r$) of transmitted power on a borrowed channel to that on a regular channel is given by $$P_r=[(b-a)/(c-1)]^\gamma$$

With these choices, the fraction, p, of users that are in a region of a cell that can access borrowed channels is given approximately by $$p=(1.1)a^2.$$

The following table lists specific numbers calculated from these formulas for various cluster sizes, N. For simplicity, a propagation exponent $\gamma=4$ has been assumed.

| N  | $P_f$ | $P_r$ | p   |
|----|-------|-------|-----|
| 3  | .02   | .29   | .08 |
| 4  | .01   | .15   | .04 |
| 7  | .10   | .28   | .18 |
| 9  | .12   | .28   | .20 |
| 12 | .26   | .41   | .36 |
| 13 | .22   | .36   | .31 |
| 16 | .25   | .38   | .33 |
| 19 | .34   | .45   | .44 |
| 21 | .33   | .43   | .41 |
| 25 | .36   | .46   | .45 |
| 27 | .45   | .54   | .54 |

In view of the above, when a new user (mobile station) wants to make a call and finds all of the channels in the cell in which the new user is residing occupied, the system determines whether a channel of an adjacent cell, which is also designated for borrowing by the new user's cell, is available. Thereafter, the system determines whether the mobile station is in a region of the cell that can be served by a borrowed channel from an adjacent cell. This is determined by monitoring a predetermined signal emitted by the base station of the cell. The predetermined signal is called a borrowed channel sensing signal (BCSS). The BCSS can be a pulsed signal or a constant signal which, if received by the user above a particular signal strength threshold on the downlink (from base station to mobile), indicates that the user is in a region of the cell wherein a channel can be borrowed from an adjacent cell. In addition, or instead, the BCSS can emanate from the mobile station and the system will measure the signal strength on the uplink (from mobile to base station) to determine if the user is in a region of the current cell wherein a channel can be borrowed from an adjacent cell.

Region 10 of FIG. 6 shows the boundary of the BCSS of each cell. In a preferred embodiment, if the signal strength of the BCSS on the downlink is not above the threshold, then channel borrowing cannot be employed by the user. However, if the BCSS is above the threshold, and if any of the neighboring cellular gateways has an idle channel available for lending to the current cell, the mobile station (new user) can use one of them. If no such channel is available, the call is blocked. Referring again to FIG. 6, reference numeral 15 designates a mobile user in cell $A^1$ who is outside of the BCSS signal range 10 and is therefore incapable of using a borrowed channel from an adjacent cell. However, reference numeral 20 designates a mobile user who is within the BCSS signal range 10 and is capable of using a borrowed channel from an adjacent cell.

Figure 7:
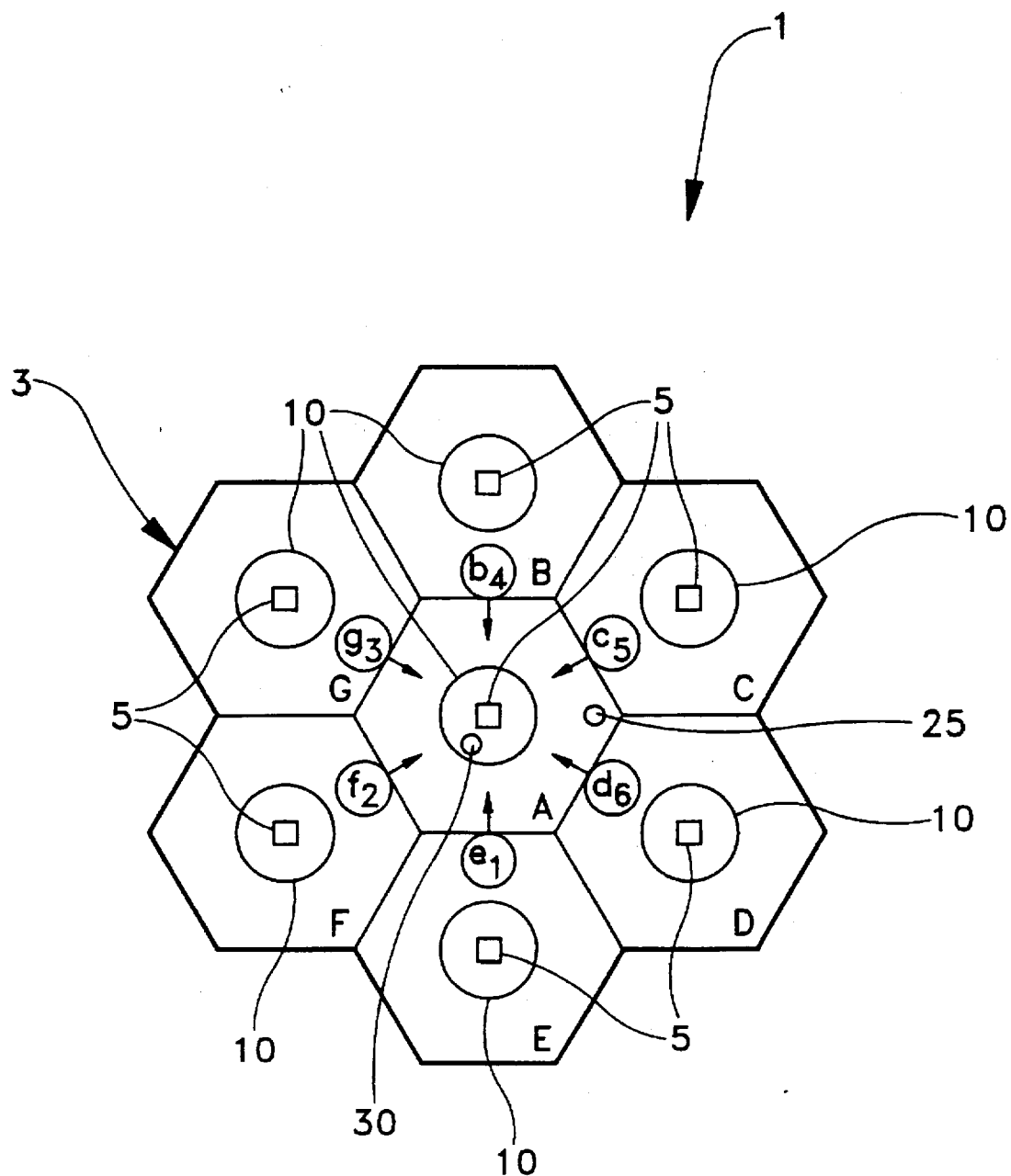
FIG. 7 is a simplified diagram illustrating the cellular communication system of the present invention wherein channel borrowing is permitted even when a new user is outside of the borrowed channel sensing signal region.

Referring now to FIG. 7, the method of the present invention may also include a step which permits channel borrowing and transmission of a new call even when all of a given cell's channels are used and the (new call) new user is not in a region where a channel can be borrowed from an adjacent cell. The method of the present invention includes monitoring the BCSS to determine whether the new user 25 is distally located from the gateway of the given cell (A) and therefore incapable of borrowing a channel from an adjacent cell (B, C, D, E, F or G). The BCSS is also monitored by all current users 30 located within the given cell (A) which are currently using a channel assigned to the given cellular gateway so as to determine whether at least one of the current users 30 is proximate to the base station of the given cell and therefore capable of borrowing a channel assigned to one of the adjacent cells. If one of the current users 30 could utilize a borrowed channel from an adjacent cell, a channel rearrangement occurs within the given cell (A). The channel rearrangement includes providing a channel from the group of channels ($e_1$, $f_2$, $g_3$, $b_4$, $c_5$ or $d_6$) from an adjacent cell (E, F, G, B, C or D), which is designated for lending to the given cell, to the current user 30 for continued transmission of the current user's signal. Thereafter, the new user 25 is provided with the channel which was previously utilized by the current user 30. As a result of the channel rearrangement, an increased system capacity for accommodating users within the cellular communication system is realized because users that cannot use borrowed channels directly (i.e., new user 25), also benefit from the channel borrowing scheme.

In another form of the present invention, so as to limit the impact of borrowing on users within a given cell, priority is given to local calls by utilizing a cut-off priority. This cut-off priority is accomplished by setting a threshold number (T) of channels assigned to each cell. Thereafter, channel usage is monitored within each cell to determine whether the number of channels currently being used is greater than the threshold number of channels. If the number of channels being used within a respective cell is greater than the threshold number of channels, even if a borrowing request is received, the respective cell will prevent a transfer of one of the channels designated for lending. As a result, if a cell receives a request to provide a channel to an adjacent cell, the borrowing request will be denied if the number of occupied channels in the given cell exceeds the threshold number (T). This channel lending scheme gives preference to a cell's own users. Thus, at high traffic loads, some channels will be available only for calls that arise in the respective cell. As a result, cells that have more than the threshold number of channels in use will not lend channels to adjacent cells. Therefore, cells that are in need of a borrowed channel must request a channel from one of the other adjacent cells.

In another embodiment of the present invention, a method is provided wherein unnecessary borrowing, which can limit the performance of a cellular communication system during high volume use, is reduced. When a channel is borrowed by a given cell in order to accommodate a new user, and thereafter a channel assigned to the given cell becomes available, the method of the present invention includes transferring the new user's transmission from the borrowed channel to the newly available channel of the given cell. Then, the borrowed channel is returned to the respective adjacent cell from which it was borrowed. This scheme of quickly returning channels assists in reducing the probability that a cell gateway may simultaneously borrow from, and lend channels to, its adjacent cells, even the same adjacent cell from which a channel is just borrowed.

Figure 8:
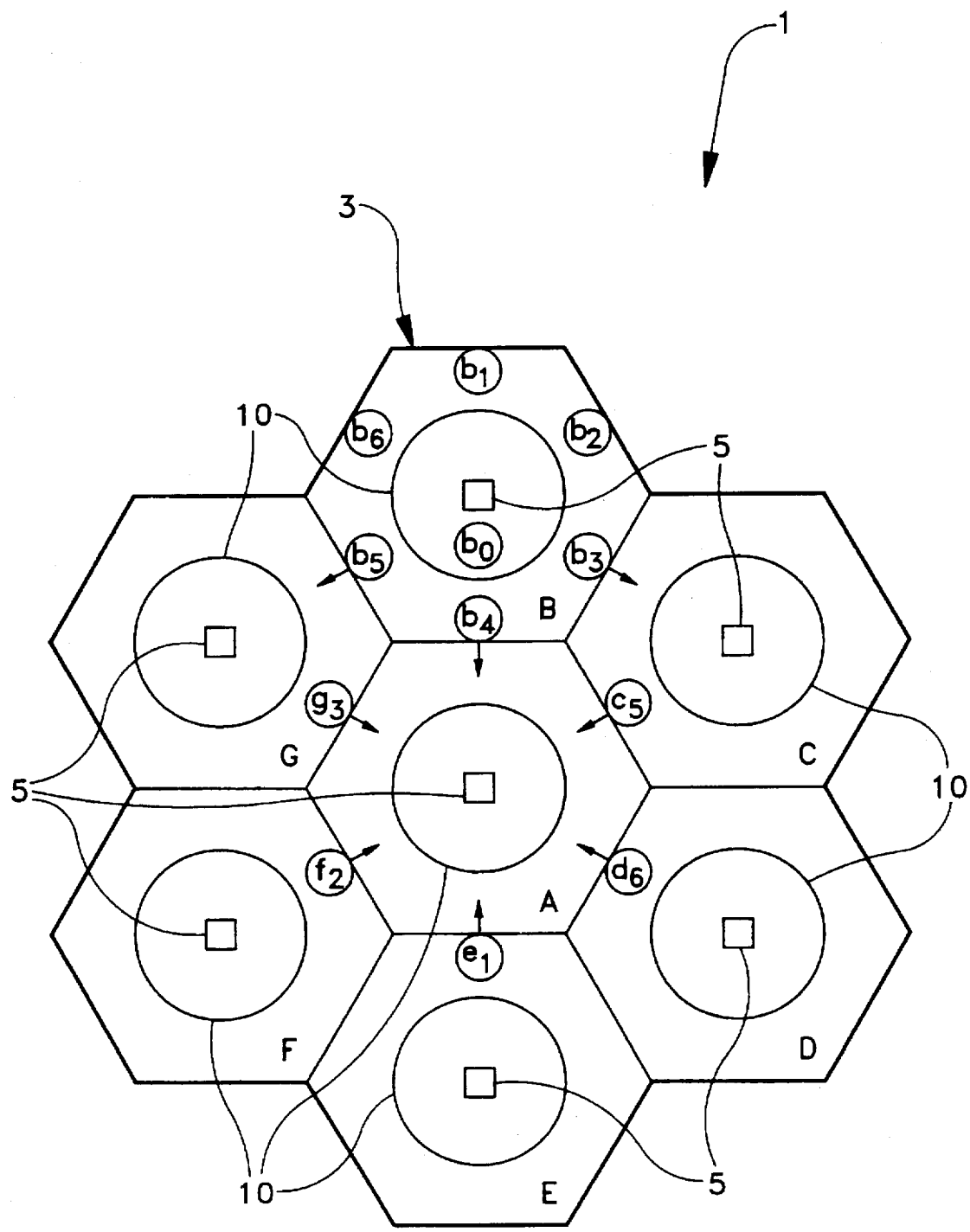
FIG. 8 is a simplified diagram illustrating the cellular communication system of the present invention employing rearrangement of channels in adjacent cells so as to accommodate a channel borrowing request in a given cell.

In order to accommodate the maximum number of users requiring a borrowed channel, another embodiment of the present invention involves rearranging channel usage in adjacent cells in order to insure that a channel is available for borrowing by a given cell. Referring to FIG. 8, such a channel rearrangement is needed wherein a first cell (A) requests a channel from one of its adjacent cells, and all channels of the adjacent cells (B, C, D, E, F and G) designated for lending to the first cell ($e_1$, $f_2$, $g_3$, $b_4$, $c_5$, $d_6$) are occupied. However, it may occur that one of the adjacent cells (B) has a channel available, but this channel belongs to one of the subgroup of channels ($b_0$, $b_1$, $b_3$, $b_5$, $b_6$) which are not designated for lending to the first cell and also at least one channel in channel subgroup $b_4$ is used by a link in cell B. So that channel borrowing could be accomplished in this situation, the method of the present invention includes transferring the signal that was being transmitted on one of the channels ($b_4$) designated for lending to the first cell (A), to the available channel of the respective adjacent cell which is not designated for lending to the first cell ($b_0$, $b_1$, $b_2$, $b_3$, $b_5$, $b_6$). Thereafter, the channel ($b_4$) designated for lending to the first cell, which is now available, is transferred to the first cell (A) to accommodate the borrowing request. Once the transmission on the borrowed channel is complete, the borrowed channel ($b_4$) is returned to the adjacent cell (B) for use therein.

Figure 9:
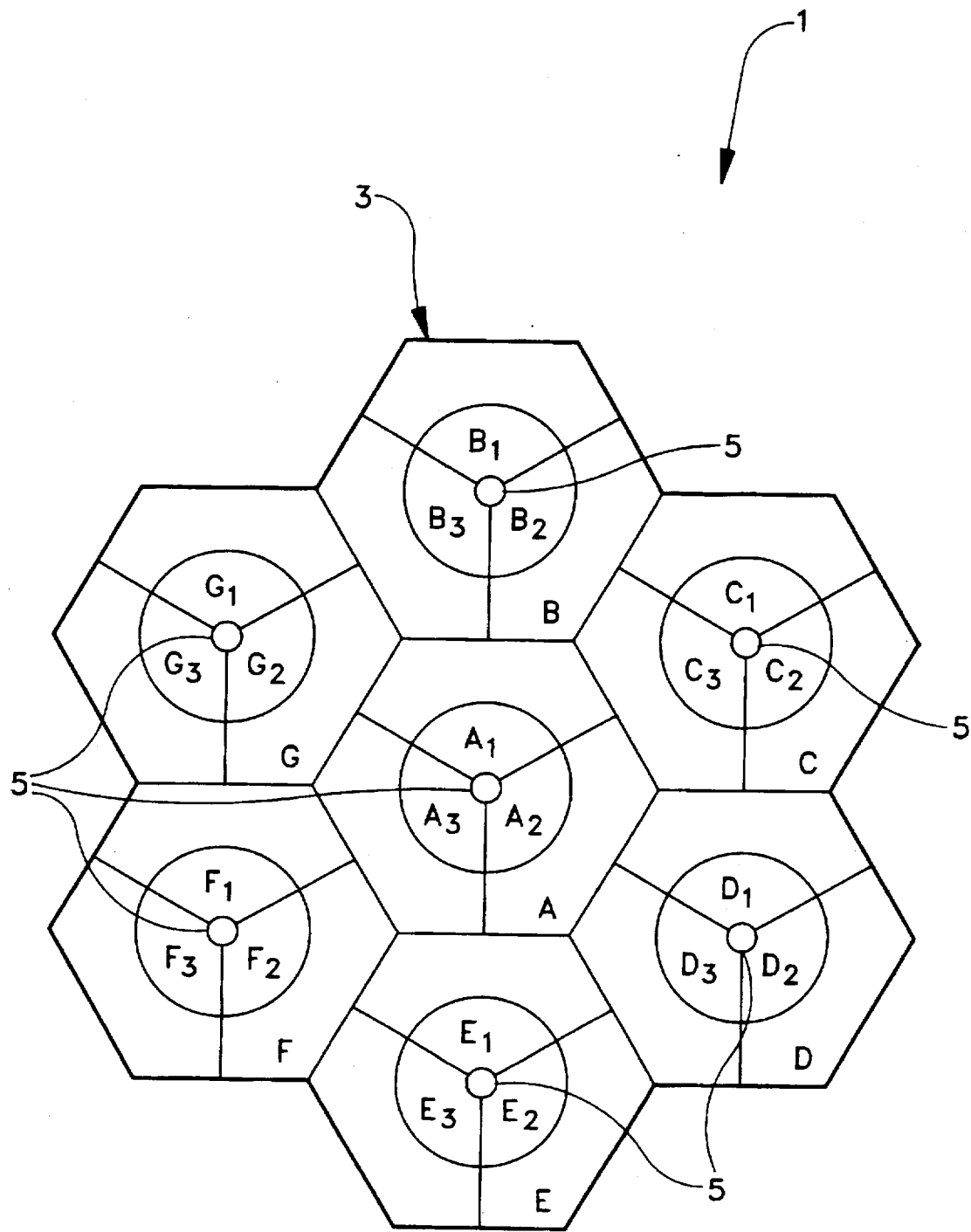
FIG. 9 is a simplified diagram illustrating a cell cluster of the present invention showing the sectorization of each cell.

In another embodiment of the present invention, a method is provided for permitting real-time borrowing of channels wherein each cell has a plurality of sector areas as shown in FIG. 9. The method includes, as previously described, determining the number of distinct channel available to the cellular communication system, specifying a cell cluster size (N), selecting N-disparate groups of channels (A, B, C, D, E, F and G) from the total number of distinct channels and assigning the N disparate groups of channels to the N cells of each cell cluster wherein one channel group is assigned to each cell. The method further includes dividing the group of channels assigned to each respective cell into a plurality of sectorized channel groups ($A_1$, $A_2$, $A_3$; $B_1$, $B_2$, $B_3$; ... $G_1$, $G_2$, $G_3$) corresponding to the number of sector base stations within each cell.

As shown in FIG. 9, each 120° sectorized area is assigned one of the plurality of sectorized channel subgroups and serviced by a respective base station. Then, each sectorized channel group is segmented into a plurality of sectorized channel subgroups wherein the number of sectorized channel subgroups corresponds to at least the plurality of cells adjacent to the respective sectorized area. The channels of the plurality of sectorized channel subgroups are respectively designated for lending from a respective sector area of a cell to one of the cells adjacent to the sector area. FIG. 9 shows the above-described sectorization of the cells of a cell cluster having three 120° sectors wherein each sectorized base station 5 serves the corresponding three cellular sector areas.

Even though the above description of the method and apparatus of assigning and sharing channels in a cellular communication system specifically referred to channel lending, borrowing and returning, the method and apparatus may also be applied to carriers that are capable of supporting a plurality of channels or time slots, which may then be lent, borrowed and returned to the lending cell as previously described.

In another embodiment of the present invention, a real-time carrier borrowing method is provided for increased channel utilization in cellular communication systems employing carriers having multiple channels. Examples of systems employing multiple channels per carrier schemes include, but are not limited to, time-space frequency multiplexes based on time-division multiple access (TDMA)/frequency division multiple access (FDMA) and code division multiple access (CDMA)/frequency division multiple access (FDMA). The method of the present invention permits real-time shifting of spectral resources to accommodate cellular communication subscriber needs on a call by call basis.

A carrier may be defined as a modulating signal (and associated spectral band) on which a multiplicity of independent information can be superimposed. One such carrier that can support multiple channels is a time slotted sinusoid at a distinct frequency. As known in the art, an array of such carriers is used for TDMA/FDMA cellular communications in the IS-54 standard. In TDMA/FDMA cellular communication systems, the frequencies of the carriers are sufficiently separated so that the spectral bands associated with the carriers are disjoint. Individual channels are formed by the time slots. In some similar TDMA/FDMA structures such as GSM, a logical channel is formed by frequency hopping among time slots in the time slotted TDMA/FDMA multiplex.

Another system that is capable of supporting multiple channels are some forms of CDMA cellular communications wherein spreading codes are utilized to permit separation of individual message signals. The spreading code along with a high frequency sinusoidal signal are combined with a message signal to form a composite signal. The bandwidth of the composite signal is largely determined by the chip-rate of the spreading code and the spectral center is determined by the frequency of the sinusoidal signal. The same sinusoidal frequency can support a multiplicity of messages (i.e., data transmission or calls) each using a distinct spreading code. The spectrum of such signals occupy the same frequency band. A sinusoidal frequency and the family of codes used with it can be considered to be a multiple channel carrier. A different sinusoidal frequency with its family of codes is another multiple channel carrier.

Since the choice of sinusoidal frequency determines the center of the band, such multiple channel carriers can be organized in a CDMA/FDMA multiplex whose spectra may overlap depending on the spectral centers and the selected bandwidth. CDMA encoded messages borne on the same sinusoidal frequency have overlapping spectra but can be separated by code. However, there typically is some interference between such messages. By choosing sinusoidal frequencies and chipping rates appropriately, an array of multiple channel carriers can be formed whose spectra do not overlap, partially overlap, or completely overlap. Such multiple channel carriers can be spatially arranged in a cellular communication system so that signal separation and mutual interference are governed by code, sinusoidal frequency and spatial distance between sources and receivers using spectral resources that overlap.

For cellular systems that use multiple channel carriers in a spatial layout, a situation may arise where additional channels are needed in one cell (a hotspot condition) while there are idle channels in nearby cells. In some systems that use multiple channel per carrier schemes, it may not be possible to borrow individual channels without creating intolerable interference with adjacent channels. Therefore, there is a need for a method wherein multiple channel carriers can be borrowed from nearby cells (in real time) to accommodate communication demands in a given cell (a hotspot cell) on a call by call basis.

The borrowing of a carrier that provides multiple channels (i.e., IS-54 wherein each carrier provides 3 TDMA slots) which can accommodate multiple calls may cause a reduced utilization of channel and system resources. Specifically, if a hotspot cell borrows a carrier (i.e., three TDMA channels together) from an adjacent cell to accommodate one call, two of the three TDMA channels are unnecessarily transferred and remain unused. To increase channel utilization and system capacity, the method of the present invention lends carriers to adjacent cells only under specific conditions and utilizes "fast carrier returning".

With fast carrier returning, a call that is using a TDMA channel from a borrowed carrier is transferred to a TDMA channel initially assigned to the transmitting cell as soon as an initially assigned TDMA channel is available to service the call. After all of the calls being transmitted on borrowed carrier channels have been transferred to a channel initially assigned to the borrowing cell or the calls have been terminated, the borrowed carrier is returned to the cell from which it was lent. As a result of the present method, borrowed carriers and their corresponding channels are returned to the lending cell as soon as practicle. In addition, calls are not serviced on a channel of a carrier from a lending cell (i.e., a borrowed carrier) if a channel that belongs to the transmitting cell is available for transmission of a call. In traditional systems that do not employ fast carrier returning, a borrowed carrier and its accompanying channels are only returned after all of the calls utilizing the borrowed carrier are complete without reorganization and shifting of channel resources.

In this embodiment of the present invention, each cell of the plurality of cell clusters preferably has C carriers initially assigned thereto. When a new call is to be transmitted or received in a first cell (Y), the first cell (Y) will not request a carrier from an adjacent cell if the first cell (Y) can accommodate the new call on one of the C initially assigned carriers. However, if all channels of every carrier initially assigned to the first cell (Y) are unavailable for transmission by the new cell, the first cell (Y) will send a carrier borrowing request to of least one adjacent cell (X). The adjacent cell (X) will lend a carrier including its respective channels to the first cell (Y) only if a carrier in the adjacent cell (Y) is properly available for lending. Specifically, the adjacent cell (X) will comply with or deny the borrowing carrier request from the first cell (Y) based on the following three criteria:

1. If the number of carriers that are currently being borrowed by the first cell (Y) from the adjacent cell (X) is less than A (which may be set based on system needs, for example 3), the adjacent cell (X) will not deny the carrier request from the first cell (Y);
2. If the number of total carriers that the adjacent cell (X) is currently lending to cells adjacent to cell (X) is less than B (which may be set based on system needs, for example 4), the adjacent cell (X) will not deny the carrier request from the first cell (Y); and
3. If the adjacent cell (X) has a plurality of carriers ($x_1$, $x_2$ ... $x_n$) and if all of the slots (channels) of at least one of the plurality of carriers is unoccupied (i.e., $x_1$), then the adjacent cell (X) can lend carrier ($x_1$) to the first cell (Y).

Assuming that each of the above conditions are met and carrier $x_1$ is provided by the adjacent cell (X) to the first cell (Y), the method of fast carrier returning may be implemented. If the first cell (Y) is also currently borrowing at least a second carrier $x_2$ from the adjacent cell (X), then one of the two borrowed carriers ($x_1$ and $x_2$) is designated the primary borrowed carrier ($x_1$) from the adjacent cell (X). In a preferred embodiment of the invention, the primary borrowed carrier corresponds to the borrowed carrier which is accommodating the least number of calls in the first cell (Y). The primary borrowed carrier is significant because this carrier is being given priority to be returned to the lending cell (adjacent cell X) before the non-primary borrowed carrier according to a predetermined channel rearrangement scheme. The method of returning borrowed carriers and specifically returning the primary borrowed carrier to the lending cell in an efficient manner utilizes the following rules:

A. If an initially assigned channel $c_1$ in the borrowing cell (i.e., first cell Y) becomes available for transmission because, for example, a call that was previously utilizing the initially assigned channel $c_1$ has been terminated, then;

1. The borrowing cell (Y) selects one of the plurality of adjacent lending cells from which the borrowing cell is currently borrowing a carrier. The selection can be done randomly from all adjacent cells that are currently lending a carrier. In an alternate embodiment, the adjacent cell that has the highest channel occupancy (usage) is selected. For illustration, the borrowing cell (Y) selects lending cell (X). In addition, each of the plurality of adjacent lending cells has a primary borrowed carrier ($x_1$) designated if the corresponding adjacent cell; and is currently lending at least two carriers to the borrowing cell; and
2. A call on the previously selected primary borrowed carrier ($x_1$) of the lending cell (X) selected in step A(1) is transferred to the initially assigned channel that has become available for transmission for $c_1$. As a result, at least one channel of the primary carrier ($x_1$) is now unused.
B. If a channel on a nonprimary borrowed carrier ($x_2$) from the adjacent lending cell (X) subsequently becomes available, a call from the primary borrowed carrier ($x_1$) is transferred to the available channel of the nonprimary borrowed carrier ($x_2$). As a result, at least one channel of the primary carrier ($x_1$) is unused.
C. If a channel on the primary borrowed carrier ($x_1$) becomes available due to, for example, termination of a call on that channel, a transfer of channel allocation is not required and at least one channel of the primary carrier ($x_1$) is now unused.

Once all calls on channels of the primary borrowed carrier ($x_1$) are complete or transferred, the primary borrowed carrier is returned to the lending cell (X). A new primary borrowed carrier ($x_2$) is chosen randomly from all remaining borrowed channels ($x_2$, $x_3$ ... $x_N$) from the landing cell (x) until all borrowed carriers are returned. In this way, all channels of the nonprimary borrowed carriers and initially assigned carriers of the borrowing cell are utilized to their maximum potential. In addition, the primary borrowed carriers are returned to the lending cell as soon as channel and carrier reallocation can be implemented. The method of providing a fast carrier return enhances the performance of TDMA, FDMA and CDMA cellular communication systems that do not employ channel borrowing with cell-to-cell time slot synchronization. The fast carrier return method increases the utilization of channels and therefore serves to increase the capacity of cellular communications systems that employ the method without requiring an increase in the spectrum of available carriers and channels. It has been shown that for a 24 carrier/cell TDMA/CBWL system, the user capacity is increased approximately 21% in comparison to a fixed channel assignment (FCA) scheme when the fraction of cells that can use a borrowed channel is just 0.2.

Although illustrative embodiments of the present invention have been described herein with reference to the accompanying drawings, it is to be understood that the invention is not limited to the precise embodiments, and that various other changes and modifications may be effected therein by one skilled in the art without departing from the scope or spirit of the invention.

We claim:

1. A method of permitting real-time borrowing of carriers in a cellular communication system having a plurality of distinct carriers, the cellular communication system having a plurality of substantially similar cell clusters, each cell cluster having a plurality of cells wherein each cell has at least one base station capable of sending and receiving transmissions, each cell having a plurality of adjacent cells, the method comprising the steps of:

determining a total number of distinct carriers (CT) available for use by the cellular communication system, the total number of distinct carriers being at most equal to the plurality of distinct carriers;

specifying a cell cluster size (N) for the cellular communication system where N=the number of cells in a cell cluster;

selecting N disparate groups of carriers from the total number of distinct carriers, each carrier within the N disparate groups of carriers being substantially distinct from any other carrier within the N disparate groups of carriers;

respectively assigning the N disparate groups of carriers to the N cells of each cell cluster wherein one carrier group is assigned to each cell; and segmenting the group of carriers assigned to each respective cell into a plurality of carrier subgroups assigned for lending to a predetermined adjacent cell, the number of carrier subgroups respectively corresponding to at least the plurality of adjacent cells, the carriers of each of the carrier subgroups being respectively designated for lending from the respective cell to said predetermined adjacent cell.

2. A method of permitting real-time borrowing of carriers in a cellular communication system as defined by claim 1, the cellular communication system including a first cell within a first cell cluster, the first cell being assigned a first group of the N groups of carriers assigned to the first cell cluster, the first cell having a plurality of adjacent cells, the method further comprising the steps of:

receiving a request at a first cell base station for use of a carrier by the first cell base station, the request for use corresponding to a new call within the first cell;

determining whether each carrier of the first group of carriers assigned to the first cell is in use;

wherein if each carrier of the first group of carriers assigned to the first cell is in use, determining whether a carrier of the carrier subgroups assigned to the plurality of cells adjacent to the first cell and designated for lending to the first cell, is available for use by the first cell base station; and transferring the available carrier from a respective adjacent cell to the first cell base station to service the new call, where upon transfer, the available carrier constitutes a borrowed carrier.

3. A method of permitting real-time borrowing of carriers in a cellular communication system as defined by claim 2, which includes the further step of temporarily transferring the borrowed carrier from the respective adjacent cell to the first cell, wherein the borrowed carrier being returned to the respective adjacent cell after the new call on the borrowed carrier is complete.

4. A method of permitting real-time borrowing of carriers, in a cellular communication system as defined by claim 2, which includes the further step of making the borrowed carrier unavailable for use in the respective adjacent cell while the borrowed carrier is being utilized in the first cell.

5. A method of permitting real-time borrowing of carriers in a cellular communication system as defined by claim 2, which further includes the step of simultaneously utilizing the borrowed carrier for transmission in any of the plurality of cell clusters while the borrowed carrier is used by the first cell.

6. A method of permitting real-time borrowing of carriers in a cellular communication system as defined by claim 2, which includes the further step of utilizing the borrowed carrier with reduced power, the borrowed carrier being capable of being utilized in a region proximate to the first cell base station.

7. A method of permitting real-time borrowing of carriers in a cellular communication system as defined by claim 2, the method further comprising the steps of:

generating a borrowed carrier sensing signal within each cell of the plurality of cell clusters, the borrowed carrier sensing signal emanating from a point proximate to the base station of a corresponding cell, the borrowed carrier sensing signal providing an indication as to whether a first user, located within the first cell is in a region of the first cell proximate to the base station so as to utilize a carrier of a subgroup of carriers assigned to cells adjacent to the first cell and designated for lending to the first cell.

8. A method of permitting real-time borrowing of carriers in a cellular communication system as defined by claim 2, the method further comprising the steps of:

generating a borrowed carrier sensing signal within each cell of the plurality of cell clusters, the borrowed carrier sensing signal emanating from user mobile stations located within each cell, the borrowed carrier sensing signal providing an indication as to whether a first user, located within the first cell is in a region of the first cell proximate to the base station so as to utilize a carrier of a subgroup of carriers assigned to cells adjacent to the first cell and designated for lending to the first cell.

9. A method of permitting real-time borrowing of carriers in the cellular communication system as defined by claim 8, the method further comprising the steps of:

monitoring the borrowed carrier sensing signal to determine whether a new user, located in the first cell and utilizing a first carrier assigned to the first cell, is distally located from the base station of the first cell and incapable of utilizing a carrier of the subgroup of carriers assigned to cells adjacent to the first cell and designated for lending to the first cell;

monitoring the borrowed carrier sensing signal to determine whether the first user, is proximate to the base station of the first cell; and wherein if the first user is proximate to the base station of the first cell and if the new user is distally located from the base station of the first cell, rearranging the carriers within the first cell, by providing the first user with a carrier from one of the sub-groups of carriers assigned to cells adjacent to the first cell and designated for lending to the first cell, and providing the new user with the first carrier which was previously utilized by the first user.

10. A method of permitting real-time borrowing of carriers in a cellular communication system as defined by claim 2, the method further comprising the steps of:

setting a threshold number (T) of carriers for simultaneous use within a respective adjacent cell where T=the maximum number of carriers of the disparate group of carriers assigned to the respective adjacent cell which can be simultaneously used in the respective adjacent cell;

monitoring carrier usage within the respective adjacent cell to determine whether the number of carriers being used in the respective adjacent cell is at least equal to the threshold number of carriers;

wherein if at least the threshold number of carriers are in use in the respective adjacent cell, preventing a transfer by the respective adjacent cell of one of the carriers of the subgroup of carriers respectively designated for lending from the respective adjacent cell to the first cell.

11. A method of permitting real-time borrowing of carriers without locking in a cellular communication system as defined by claim 2 wherein if a second carrier of the disparate group of carriers assigned to the first cell becomes available for use after the borrowed carrier is transferred to the first cell from one of the plurality of adjacent cells, the method further comprising the steps of:

transferring the transmission of the current signal from the borrowed carrier to the second carrier of the disparate group of carriers assigned to the first cell; and returning the borrowed carrier to the respective adjacent cell from which it was borrowed.

12. A method of permitting real-time borrowing of carriers in a cellular communication system as defined by claim 2 wherein if the first cell receives a channel borrowing request for use of a carrier and each carrier of the first group of carriers are occupied so that the first cell requests to borrow a carrier from one of the carrier subgroups designated for lending to the first cell from a respective adjacent cell, and if the carrier subgroups of adjacent cells designated for lending to the first cell are in use including a third carrier in a first adjacent cell which is transmitting a third signal, and if a fourth carrier which belongs to a carrier subgroup of the first adjacent cell that is not designated for lending to the first cell is available for use within the first adjacent cell, the method further comprising the steps of:

transferring the third signal from the third carrier to the fourth carrier of the first adjacent cell, the fourth carrier being used for transmission of the third signal; and transferring the third carrier from the first adjacent cell to the first cell for use by the first cell in order to accommodate the carrier borrowing request.

13. A method of permitting real-time borrowing of carriers in a cellular communication system as defined by claim 1, the method further comprising the steps of:

orienting the cells which have common distinct carrier assignments in the plurality of cell clusters so that cells having substantially the same group of distinct carriers are equidistant from one another.

14. A method of permitting real-time borrowing of carriers in a cellular communication system having a plurality of distinct carriers, the cellular communication system having a plurality of substantially similar cell clusters, each cell cluster having a plurality of sectorized cells wherein each sectorized cell has a plurality of sector areas, each sectorized cell having a plurality of sectorized base stations capable of sending and receiving transmissions in a corresponding sectorized area of the cell, each sector area having a plurality of adjacent sectorized cells, the method comprising the steps of:

determining a total number of distinct channels ($C_T$) available for use by the cellular communication system, the total number of distinct carriers being at most equal to the plurality of distinct carriers;

specifying a cell cluster size (N) for the cellular communication system where N=the number of sectorized cells in a cell cluster;

selecting N disparate groups of carriers from the total number of distinct carriers, each carrier within the N disparate groups of carriers being substantially distinct from any other carrier within the N disparate groups of carriers;

respectively assigning the N disparate groups of carriers to the N sectorized cells of each cell cluster wherein one carrier group is assigned to each sectorized cell;

respectively dividing the group of carriers assigned to each respective sectorized cell into a plurality of sectorized carrier groups corresponding to the number of sectorized base stations within each sectorized cell; and segmenting each sectorized carrier group into a plurality of sectorized carrier subgroups assigned for lending to a predetermined adjacent cell, the number of sectorized carrier subgroups respectively corresponding to at least the plurality of adjacent sectorized cells, the channels of each of the sectorized carrier subgroups being respectively designated for lending from the respective sector area to one said predetermined adjacent sectorized cell.

15. A method of permitting real-time borrowing of carriers in a cellular communication system as defined by claim 14, the cellular communication system including a first sector area within a first sectorized cell within a first cell cluster, the first sectorized cell being assigned a first group of the N groups of carriers assigned to the first cell cluster, the first sectorized cell having a plurality of sector areas and corresponding sectorized base stations with respective sectorized carrier subgroups assigned thereto, the first sector area having a plurality of adjacent sectorized cells, the method further comprising the steps of:

receiving a request, at a first sectorized base station, for use of a carrier by the first sector area, the request for use corresponding to a new call within the first sector area;

determining whether each carrier of a first group of sectorized carrier subgroups assigned to the first sectorized base station of the first sector area is in use;

wherein if each carrier of the first group of sectorized carrier subgroups assigned to the first sectorized base station is in use, determining whether a carrier of the sectorized carrier subgroups assigned to the plurality of sector areas adjacent to the first cell and designated for lending to the first cell, is available for use by the first sectorized base station; and transferring the available carrier from a respective sector area in an adjacent sectorized cell to the first sectorized base station to service the new call, where upon transfer, the available carrier constitutes a borrowed carrier.

16. A cellular communication system permitting real-time borrowing of carriers, the cellular communication system comprising:

a plurality of carriers; and a plurality of cell clusters, each of the plurality of cell clusters having a plurality of cells, each of the plurality of cells having a plurality of adjacent cells and at least one transmitter, the plurality of carriers being divided into a first plurality of carrier groups corresponding to the plurality of cells utilized for each cell cluster, each carrier group of the first plurality of carrier groups being respectively assigned to one of the plurality of cells of each cell cluster for lending to a predetermined adjacent cell, each carrier group of the first plurality of carrier groups being further divided into a plurality of carrier sub-groups, the plurality of carrier sub-groups being at least equal to the number of adjacent cells, the carriers of each carrier sub-groups respectively being designated for lending to the transmitter of said predetermined adjacent cell.

17. A cellular communication system permitting real-time borrowing of carriers as defined by claim 16, wherein each cell cluster is adjacent to at least one other cell cluster.

18. A cellular communication system permitting real-time borrowing of carriers as defined by claim 16, wherein each of the plurality of cell clusters has substantially the same orientation of cells and wherein each of the plurality of cell clusters has substantially the same plurality of carrier groups and substantially the same plurality of carrier sub-groups assigned to corresponding cells.

19. A cellular communication system permitting real-time borrowing of carriers as defined by claim 16, wherein each cell includes a plurality of sectorized base stations, each sectorized base station providing transmission and reception in a respective direction, the plurality of unidirectional base stations providing omnidirectional coverage for the corresponding cell.

20. A method of returning a borrowed carrier signal from a borrowing cell to a lending cell in a cellular communication system, the carrier signal corresponding to a plurality of channels, the cellular communication system having a plurality cell clusters, each cell cluster having a plurality of cells wherein each cell has at least one base station capable of at least one of sending and receiving transmissions on the plurality of channels of the plurality of carrier signals, each cell having a plurality of adjacent cells, the borrowing cell borrowing at least a first and second carrier signal from at least one of the plurality of adjacent cells, the at least one of the plurality of adjacent cells corresponding to a lending cell, the at least a first and second carrier signal corresponding to a borrowed carrier for signal transmission of a call from the borrowing cell, the method comprising:

determining from which of the plurality of adjacent cells the borrowing cell received at least first and second carrier signals; and for each of the plurality of adjacent cells that provide at least first and second carrier signals to the borrowing cell, selecting one of the first and second carrier signals as a primary borrowed carrier and one of the first and second carrier signals as a nonprimary borrowed carrier, the primary borrowed carrier being given priority for return to the corresponding lending cell over the non-primary borrowed carrier.

21. A method of returning a borrowed carrier signal from a borrowing cell to a lending cell in a cellular communication system as defined by claim 20, the borrowing cell having a plurality of borrowing cell carriers and corresponding borrowing cell channels, the method further comprising the steps of:

determining whether at least one of the plurality of borrowing cell channels is available for signal transmission of a call;

selecting one of the plurality of adjacent cells from which the borrowing cell received at least first and second carrier signals as a transfer cell; and transferring a call from the primary borrowed carrier of the transfer cell to the available channel of the borrowing cell.

22. A method of returning a borrowed carrier signal from a borrowing cell to a lending cell in a cellular communication as defined by claim 20, the method further comprising the steps of:

determining whether a channel of the non-primary borrowed carrier is available for signal transmission of a call; and transferring a call from one of the channels of the primary borrowed carrier to the available channel of the non-primary borrowed carrier.

23. A method of permitting real time borrowing of carrier signals in a cellular communication system, each carrier signal corresponding to a plurality of channels, the cellular communication-system having a plurality of cell clusters, each cell cluster having a plurality of cells including at least first and second cells, wherein each of the plurality of cells utilizes at least one base station capable of at least one of sending and receiving signal transmissions corresponding to calls on a plurality of carrier signals, each cell having a plurality of carrier signals and a plurality of adjacent cells, the method comprising the steps of:

a. receiving a request to transmit or receive a new call within the first cell, the request being the result of the new call within the first cell;

b. determining whether each of the plurality of carriers of the first cell are unavailable to transmit or receive the new call;

c. transmitting a carrier borrowing request from the first cell to at least one of the plurality of adjacent cells;

d. determining whether the at least the plurality of adjacent cells should one of grant or deny the carrier borrowing request transmitted by the first cell, where the at least one of the plurality of adjacent cells corresponds to a prospective lending cell.

24. A method of permitting real time borrowing of carrier signals in a cellular communication as defined by claim 23, wherein step (d) further comprises:

determining whether the number of carrier signals provided from the prospective lending cell to the first cell is substantially equal to a predetermined value A, wherein if the number of carrier signals provided from prospective lending cell to the first cell is less than A, the prospective lending cell will provide a carrier signal to the first cell to accommodate the new call, and wherein if the number of carrier signals provided from the prospective lending cell to the first cell is at least equal to A, the prospective lending cell will deny the request to provide a carrier signal to the first cell to accommodate the new call.

25. A method of permitting real time borrowing of carrier signals in a cellular communication as defined by claim 23, wherein step (d) of the method further comprises:

determining whether the number of carrier signals provided from the prospective lending cell to each of the plurality of adjacent cells is substantially equal to a predetermined value B, wherein if the number of carrier signals provided by the prospective lending cell to each of a plurality of calls adjacent to the prospective lending cell is less than B, the lending cell will provide a carrier signal to the first cell to accommodate the new call, and wherein if the number of carrier signals provided by the prospective lending cell to each of the plurality of cells adjacent to the prospective lending cell is at least equal to B, the prospective lending cell will deny the request to provide a carrier to the first cell to accommodate the new call.

26. A method of permitting real-time borrowing of carrier signals in a cellular communication as defined by claim 23, the prospective lending cell having a first carrier including a plurality of channels, wherein step (d) of the method further comprises:

determining whether each of the plurality of channels of the first carrier of the prospective lending cell are available for transmission, wherein if each of the plurality of channels of the first carrier of the prospective lending cell are available for transmission, providing the first carrier to the first cell to accommodate the new call, and wherein if at least one of the plurality of channels of each of the plurality of carrier signals of the prospective lending cell are unavailable, the prospective lending cell will deny the request to provide a carrier signal to the first cell to accommodate the new call.

* * * * *